UNITED STATES PATENT OFFICE.

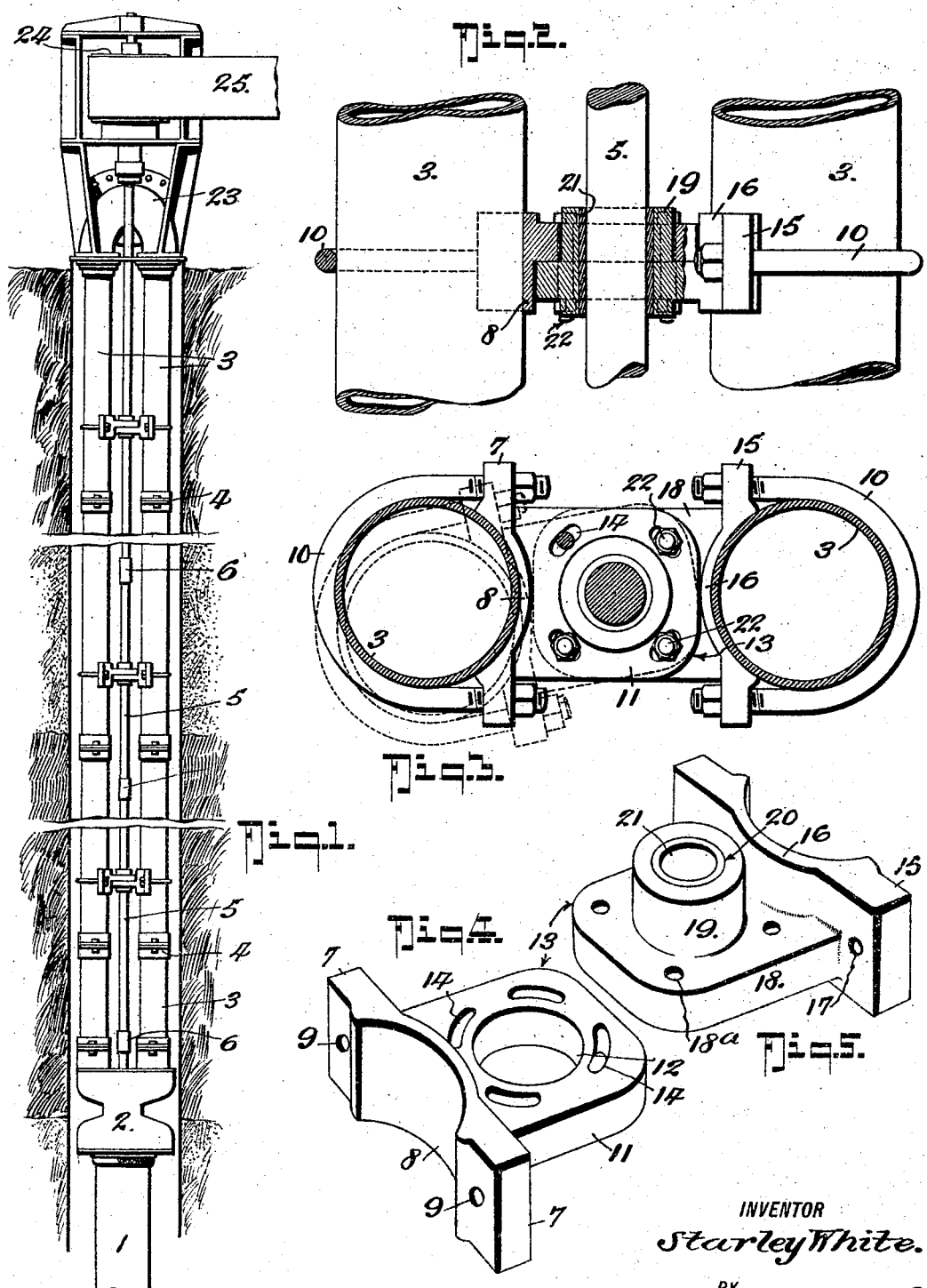

STARLEY WHITE, OF STUTTGART, ARKANSAS.

CENTRIFUGAL PUMPING APPARATUS.

1,237,229.  Specification of Letters Patent.  Patented Aug. 14, 1917.

Application filed September 15, 1916. Serial No. 120,255.

*To all whom it may concern:*

Be it known that I, STARLEY WHITE, residing at Stuttgart, in the county of Arkansas and State of Arkansas, have invented certain new and useful Improvements in Centrifugal Pumping Apparatus, of which the following is a specification.

My invention relates to certain new and useful improvements in the construction of centrifugal pumps for deep well and other services, and the invention primarily has for its object to provide a pump in which the line shaft is supported in oilless bearings that are sustained by a coupling to the discharge pipes of the pump.

In its more detail nature, the invention includes those novel features of construction, combination and arrangement of parts, all of which will be first fully described, then be specifically pointed out in the appended claims, and illustrated in the accompanying drawing, in which:—

Figure 1 is a side elevation, illustrating the invention in use, the well being shown in section.

Fig. 2 is an enlarged detail section and part elevation of one of the oilless bearings.

Fig. 3 is a top plan view of the parts shown in Fig. 2.

Figs. 4 and 5 are detail perspective views of the two parts of the shaft bearing and discharge pipe saddles.

In the drawings in which like numerals of reference indicate like parts in all of the figures, 1 represents the suction pipe of the centrifugal pump 2, from which pump a pair of parallelly disposed discharge pipes 3 convey the water to the discharge head 23 at the top of the well. The pipes 3 are made in sections coupled together, as at 4, according to the usual practice, and the line shaft 5 is made in sections with the usual couplings 6. At suitable intervals, bearings are provided for supporting the line shaft and bracing the discharge pipes, and by reference to Figs. 2 to 5 inclusive, it will be seen that my improved bearings comprise a pair of saddle members, one of which 8, has lugs 7 that are provided with apertures 9 through which the U-clip bolts 10 pass, the bolts 10 embracing the pipes 3 and serving to secure the saddle 8 in rigid engagement with the pipes.

Projecting from the saddle 8 is a plate 11 having a bore 12 to receive a lug 19 on the plate 18 of the opposing saddle 16 that is secured to the opposite pipe 3 by U-clip bolts 10 that pass through the apertures 17 in the lugs 15 of the saddle 16. The plate 11 is provided with slots 14 that register with the bolt holes 18$^a$ in the plate 18 and the plates 11 and 18 have their free ends rounded, as at 13, so that the plate 11 may be swiveled on the lug 19 of the plate 18.

The lug 19 is bored at 20 and bushed at 21 with a suitable oilless bearing material of any ordinary construction to form a line shaft bearing in which the line shaft 5 may rotate.

Suitable bolts 22 pass through the bolt holes 18$^a$ and through the slots 14 and secure the plates 11 and 18 rigidly together.

24 is the drive pulley of the line shaft which is turned through a drive belt 25 in the usual way.

It will be observed that by using my construction of bearing and saddle plate, it is obvious that should the pipes 3 not lie in a straight line (see dotted lines in Fig. 3) the swiveling of the plate 11 on the lug 19 of the plate 18 within the limits of the slot 14 will occur so that the bearings will adjust themselves to any slight inaccuracies in the alinement of the pipes 3 and the line shaft 5. After the bearings have been put in place the plates 11 and 18 are securely clamped together by the bolts 22, as will be clearly understood by reference to the drawing.

By the use of self-oiling bearing material 21 it is not necessary to lubricate the several shaft bearings and by constructing the bearings as shown and described greater facility in assembling and placing of the pumps is effected.

What I claim is:

1. In combination with the discharge pipes and the line shaft of a centrifugal pumping apparatus, of saddle members rigidly secured to the respective discharge pipes, a pivotal connection between said saddle members, means for clamping said connection to hold said saddle members rigid and a line shaft bearing located at the pivotal axis of said members.

2. In a centrifugal pumping apparatus, the combination with a pair of discharge pipes and a line shaft located between said pipes, of saddle members, means rigidly securing said saddle members to the respective discharge pipes, said saddle members having overlapping plates, one of said plates having a lug and the other of said plates having an aperture into which said lug passes, whereby said plates are pivotally engaged, bolts connecting said plates together and a line shaft bearing in said lug substantially as shown and described.

3. A line shaft bearing and discharge pipe brace for centrifugal pumping apparatus comprising a pair of opposing saddle members, said saddle members having ears, clip bolts embracing said discharge pipes and secured to said ears for holding said saddle members on the discharge pipes, said saddle members having overlapping plates, one of which is provided with a hole and the other of which is provided with a lug to enter said hole, whereby said plates are swivelly engaged, bolts passing through said plates, one of said plates being slotted where the bolts pass through the same for adjustment purposes, and a line shaft bearing in said lug.

STARLEY WHITE.

Copies of this patent may be obtained for five cents each, by addressing the "Commissioner of Patents, Washington, D. C."